US010692371B1

(12) United States Patent
Nix et al.

(10) Patent No.: US 10,692,371 B1
(45) Date of Patent: Jun. 23, 2020

(54) SYSTEMS AND METHODS FOR CHANGING AUTONOMOUS VEHICLE OPERATIONS BASED ON USER PROFILES

(71) Applicant: UATC, LLC, San Francisco, CA (US)

(72) Inventors: Molly Castle Nix, San Francisco, CA (US); Sean Chin, Pittsburgh, PA (US); Dennis Zhao, Pittsburgh, PA (US); Emily Cairns Duff Bartel, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 74 days.

(21) Appl. No.: 15/646,637

(22) Filed: Jul. 11, 2017

Related U.S. Application Data

(60) Provisional application No. 62/522,207, filed on Jun. 20, 2017.

(51) Int. Cl.
| | |
|---|---|
| *G08G 1/0968* | (2006.01) |
| *G01S 17/93* | (2020.01) |
| *G01S 5/14* | (2006.01) |
| *G01S 17/42* | (2006.01) |
| *G01S 19/41* | (2010.01) |
| *G01S 19/47* | (2010.01) |
| *G01S 19/48* | (2010.01) |
| *G08G 1/127* | (2006.01) |
| *B60K 31/00* | (2006.01) |
| *G05D 1/00* | (2006.01) |
| *G01S 1/00* | (2006.01) |

(Continued)

(52) U.S. Cl.
CPC ............ *G08G 1/0968* (2013.01); *G01S 5/14* (2013.01); *G01S 17/42* (2013.01); *G01S 17/93* (2013.01); *G01S 19/41* (2013.01); *G01S 19/47* (2013.01); *G01S 19/48* (2013.01); *G08G 1/127* (2013.01); *B60K 31/00* (2013.01); *G01S 1/00* (2013.01); *G01S 5/00* (2013.01); *G05D 1/00* (2013.01); *G06F 19/00* (2013.01)

(58) Field of Classification Search
CPC ...... G08G 1/0968; G08G 1/127; G01S 19/48; G01S 5/14; G01S 17/42; G01S 19/41; G01S 19/47; G01S 17/93; G01S 1/00; G01S 5/00; B60K 31/00; G05D 1/00; G06F 19/00
See application file for complete search history.

(56) References Cited

U.S. PATENT DOCUMENTS

| | | |
|---|---|---|
| 9,606,539 B1 | 3/2017 | Kentley et al. |
| 9,632,502 B1 | 4/2017 | Levinson et al. |
| 9,811,086 B1 | 11/2017 | Poeppel et al. |

(Continued)

*Primary Examiner* — Yuen Wong
(74) *Attorney, Agent, or Firm* — Dority & Manning, P.A.

(57) ABSTRACT

Systems and methods are provided for determining operation of an autonomous vehicle based on user profiles. In one example, a computer-implemented method of applying user profiles for autonomous vehicle operation is provided. The method includes receiving, by a computing system comprising one or more computing devices, a trip request from a user; retrieving, by the computing system, a user profile associated with the user; determining, by the computing system, one or more trip attribute settings based at least in part on the user profile; and providing, by the computing system, the determined one or more trip attribute settings to a vehicle computing system for determining autonomous vehicle operation during a trip associated with the trip request.

16 Claims, 9 Drawing Sheets

(51) Int. Cl.
*G01S 5/00* (2006.01)
*G06F 19/00* (2018.01)

(56) References Cited

U.S. PATENT DOCUMENTS

| | | |
|---|---|---|
| 10,248,913 B1 | 4/2019 | Gururajan et al. |
| 2015/0339928 A1* | 11/2015 | Ramanujam ........... G08G 1/202 |
| | | 701/23 |
| 2016/0247109 A1 | 8/2016 | Scicluna et al. |
| 2017/0158023 A1* | 6/2017 | Stevanovic ........ B60H 1/00771 |
| 2017/0169366 A1 | 6/2017 | Klein et al. |
| 2017/0192437 A1 | 7/2017 | Bier et al. |
| 2017/0262790 A1 | 9/2017 | Khasis |
| 2017/0323244 A1 | 11/2017 | Rani et al. |
| 2018/0136651 A1 | 5/2018 | Levinson et al. |
| 2019/0196503 A1 | 6/2019 | Abari et al. |

\* cited by examiner

SYSTEMS AND METHODS FOR CHANGING AUTONOMOUS VEHICLE OPERATIONS BASED ON USER PROFILES

FIELD

The present disclosure relates generally to the operation of an autonomous vehicle. More particularly, the present disclosure relates to determining one or more operations of an autonomous vehicle based on preferences associated with a user profile.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

The autonomous nature of such vehicles may create challenges to providing a customized or personalized experience for a rider during an autonomous vehicle trip. The systems and methods of the present disclosure provide means to address such challenges.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of applying user profiles for autonomous vehicle operation. The method includes receiving, by a computing system comprising one or more computing devices, a trip request from a user. The method further includes retrieving, by the computing system, a user profile associated with the user. The method further includes determining, by the computing system, one or more trip attribute settings based at least in part on the user profile. The method further includes providing, by the computing system, the determined one or more trip attribute settings to a vehicle computing system for determining autonomous vehicle operation during a trip associated with the trip request.

Another example aspect of the present disclosure is directed to an autonomous vehicle. The autonomous vehicle includes a vehicle computing system including one or more processors; and one or more memories including instructions that, when executed by the one or more processors, cause the one or more processors to perform operations. The operations include receiving data indicative of a trip service. The operations further include receiving one or more trip attribute settings determined based at least in part on a user profile. The operations further include applying the determined one or more trip attribute settings in determining the autonomous vehicle operation during a trip associated with the trip service.

Another example aspect of the present disclosure is directed to a computing system. The computing system includes one or more processors; and one or more memories including instructions that, when executed by the one or more processors, cause the one or more processors to perform operations. The operations include receiving a trip request from a user. The operations further include retrieving a user profile associated with the user. The operations further include determining one or more trip attribute settings based at least in part on the user profile. The operations further include providing the determined one or more trip attribute settings to an autonomous vehicle to be applied in determining operation of the autonomous vehicle during a trip.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
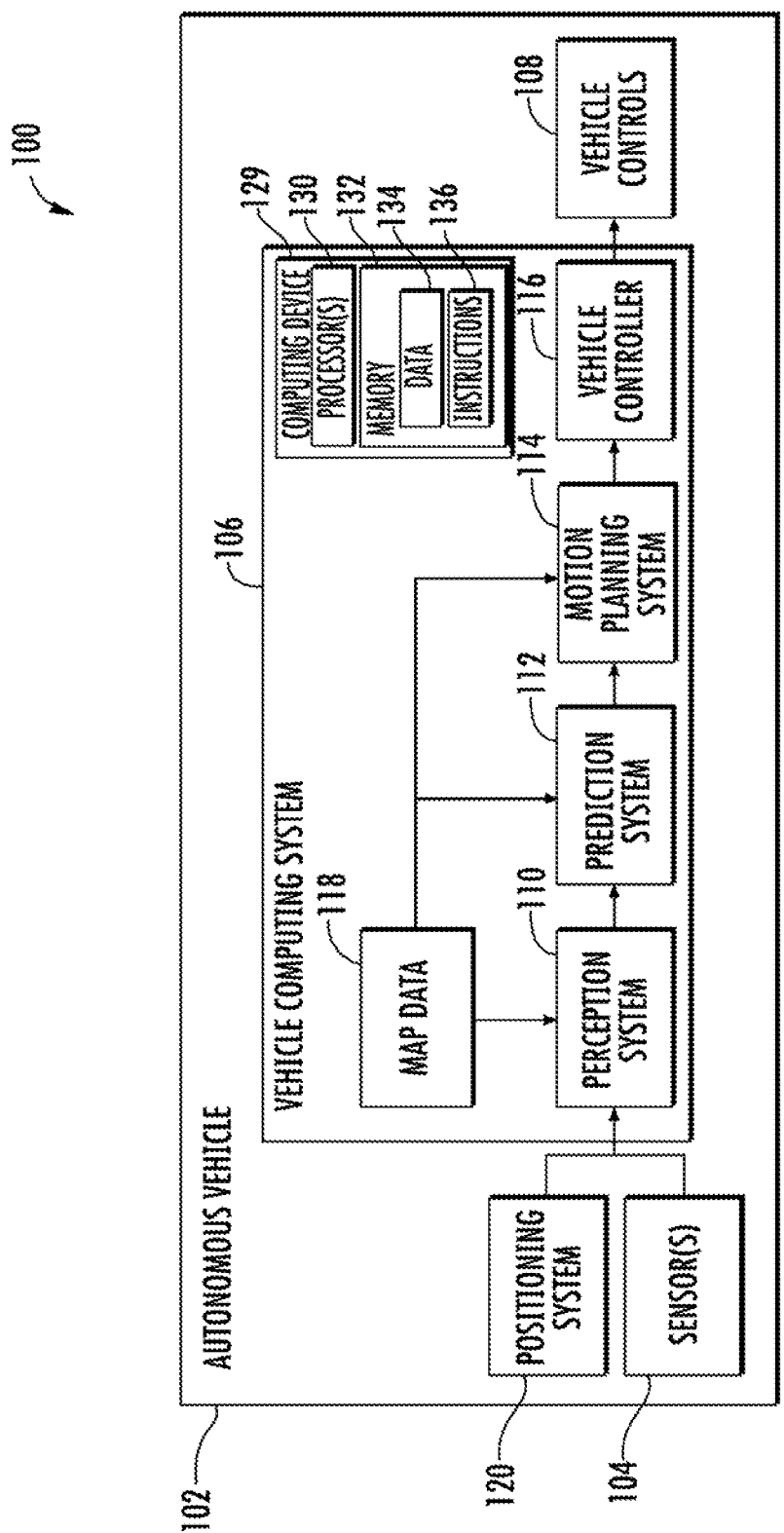
FIG. 1 depicts a block diagram of an example system for controlling the navigation of a vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Generally, example aspects of the present disclosure are directed to determining operation of an autonomous vehicle in response to user profile preferences. For example, a user profile may contain data associated with a user that can be used to modify attributes of the operation and/or behavior of an autonomous vehicle during a particular trip. A user profile can include a plurality of attributes or settings that indicate a particular user's preferences. These attributes or settings may then be used to set or adjust one or more operational aspects of the autonomous vehicle for that user as the autonomous vehicle provides a vehicle service to the user, such as during a rideshare trip, delivery trip, etc. For example, a user profile may include data regarding one or more of a user's trip history, preferences for certain routes, highways, and/or stops, preferred vehicle settings, driving style preferences, vehicle type preferences, and the like. In some implementations, the user profile data can be provided to an autonomous vehicle after the user requests a trip (e.g., a vehicle service request such as a rideshare trip, delivery trip, courier trip, or the like), and the autonomous vehicle can then implement one or more of the preferences or settings in determining the autonomous vehicle's operation and/or behavior during the user's trip. For example, a rider may prefer to prioritize speed over comfort, or alternatively comfort over speed, during a requested trip. Such a user preference could then be used to modify the way the autonomous vehicle is routed during the trip, the travel speeds of the autonomous vehicle, the braking of the autonomous vehicle, other autonomous vehicle behavior, and the like, for example.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The one or more vehicles can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

In particular, in some implementations, an operations computing system (e.g., a computing system of an entity associated with an autonomous vehicle) can generate a user profile associated with a particular user (e.g., rider, delivery service, courier, etc.). For example, information that can be used in generating and/or maintaining a user profile may be collected from one or more application platforms, such as a ride sharing application platform, from one or more vehicle computing systems, or directly from a user (for example, through an application user interface). A user profile may be generated for a user (e.g., rider, delivery service, courier, etc.) and the user profile may be associated with, or alternatively be a part of, the user account for an application platform, such as a ride sharing application platform, for example. Additionally, in some embodiments, the application platform may be associated with an entity associated with the autonomous vehicle (e.g., the owner of the autonomous vehicle, the managing entity of a fleet including the autonomous vehicle, etc.).

In some embodiments, a user profile may be generated for a user after the user has established a user account on an application platform, such as a ride sharing application platform. For example, a user profile may be generated as a user participates in trips and/or services using the application platform. In some embodiments, the user profile may be developed, at least in part, in the background, such as by populating profile attributes using default settings and/or prior trip and/or service histories.

In some embodiments, one or more machine learning systems may be used, at least in part, in the development of user profiles. For example, in some embodiments, machine learning systems may provide for more intelligent population of default settings in a user profile and/or populating user profile settings when preferences are not provided by the user.

In some embodiments, the user may be able to establish and/or modify preferences and settings in the user profile. For example, in some embodiments, a user profile may contain elements that can be modified by the user as well as elements that are determined, for example, by the application platform, and which cannot be modified by the user. In some embodiments, a user may be provided with at least some part of the information collected in the user profile (for example, displayed using a graphical user interface or the like). The user may then be able to verify the collected information, and additionally in some cases, the user may be provided with the ability to modify some part of the collected information.

A user profile may include various types of information associated with the user. For example, in some embodiments, user profiles may include preferences or attributes for one or more of music settings/entertainment preference (e.g., quiet mode, music, news, or the like), driving style (e.g., aggressive, passive, etc.), preferred routes (e.g., highway versus backroads, specific streets to use or avoid, etc.), voice control preferences (e.g., character, tone, volume, etc.), side-of-car preference, preferred vehicle, and/or the like. An autonomous vehicle may then use these attributes from a user profile to determine and/or configure operations of an autonomous vehicle to personalize trips for the user, as further described herein.

In some embodiments, the user profile may store various data associated with a user and the user's prior history from a plurality of sources. For example, in some embodiments, a user profile may store user preference attributes, trip history, vehicle settings, preferences for highways or local roads, favored/disfavored routes, stops made during trips (for example, restaurants, stores, sites, etc.), and the like.

In some embodiments, the data in a user profile may include data associated with a plurality of categories, for example, categories such as routing, environment, driving style, or the like. In some embodiments, user profiles may also comprise day and/or time of day information associated with attributes or categories, for example, preferences associated with a work commute versus going out socially in the evening or on weekends, weekday preferences versus weekend preferences, etc. Additionally, the user profiles may also include seasonal information associated with attributes or categories, such as vehicle environment preferences during winter versus vehicle environment preferences during summer and the like.

In some embodiments, a user profile may include user preference data such as settings for entertainment, temperature, lighting, scents, seat positions, driving characteristics (e.g., avoid highways, avoid left lane, minimize lane changes, minimize speed bumps, scenic routes, etc.), autonomous vehicle comfort level (e.g., avoid high speed or high traffic roads, etc.), autonomous vehicle behavior (e.g., travel speed, braking, turning behavior, etc.), and/or the like. A user profile may also include data regarding travel modes, such as a tourist mode to take in scenery or interesting sites, business mode to use a trip for a meeting (e.g., travel for a certain period of time, drop off and return to pick up after a designated period, etc.), fast as possible mode, slow driving mode, delivery mode, or the like.

A user can be permitted a certain level of control over the types of information included in the user's profile. In some implementations, data/information associated with the user can be treated and/or processed using one or more techniques before it is stored and/or used. For example, one or more processing techniques can be utilized to remove certain user information and/or geographic information associated with the user. In some implementations, a user profile may not be created unless the user downloads a particular software application, selects a setting on a user device, etc. This can allow a user to elect whether (and/or when) the entity obtains user information.

Once a user profile has been generated, the user profile may then be used to determine and apply the user's preferences during any future trip requests. For example, in some implementations, the user profiles may be stored by the operations computing system, for instance, on an application platform (e.g., such as a ride sharing platform). The user profiles may be retrieved and provided to an autonomous vehicle in response to a trip request from the user, such that the autonomous vehicle can apply one or more of the user profile settings in determining the autonomous vehicle operation for the requested trip. For example, in some embodiments, a user profile may be retrieved upon receiving a trip request. Then, at least some portion of the user profile data can be provided to an autonomous vehicle when it is selected or deployed in response to the trip request (e.g., once the autonomous vehicle has confirmed the request). In some embodiments, only a certain portion of user profile data may be provided to the autonomous vehicle, for example, preferences and settings that are relevant to the type of trip, time of day, particular vehicle, and/or the like. This can be done to avoid unnecessary usage of computational storage onboard the autonomous vehicle, for example.

In some implementations, the user profile data may be used to set and/or modify the autonomous vehicle operation and/or settings at one or more points in a requested trip. For example, in some embodiments, user profile data may be provided to an autonomous vehicle once the autonomous vehicle has been selected or deployed for a requested trip. The autonomous vehicle may apply the settings/attributes of the user profile shortly before or when arriving to the user to initiate the trip. Additionally, or alternatively, the autonomous vehicle may apply or adjust one or more relevant settings/attributes at any time during a user's trip. For example, some settings/attributes may be applied prior to the autonomous vehicle arriving to the user, such as routing preferences and/or the like. Other settings/attributes may be applied as the autonomous vehicle is arriving to the user or during the trip, for example, preferences for lighting, music, temperature, seat position, driving style preferences, and/or the like.

In some embodiments, a computing system, such as may be included in an application platform (e.g., ride sharing platform) or an autonomous vehicle (e.g., vehicle computing system), can include data indicating autonomous vehicle behavior or operating parameters that may be affected or modified based at least in part on a user profile's preferences or attributes. In one example, an autonomous vehicle (e.g., vehicle computing system) may include a data structure which maps user profile preference/attribute fields to autonomous vehicle operation parameters such that the user profile preferences/attributes can be used in determining and/or modifying autonomous vehicle operation during a requested trip for the user.

As one example, in some embodiments, user profile preferences such as driving style and/or rider comfort level preferences may be mapped to the determination of vehicle operation parameters such as travel speed, braking style, turning style, and/or the like. In another example, user profile preferences such as driving style preferences and/or route preferences may be mapped to the determination of vehicle operation parameters such as vehicle route planning (e.g., motion planning in a vehicle computing system). In such embodiments, the user profile preferences/attributes can be considered in the determination of the behavior or operation of the autonomous vehicle, for example, by adjusting factor weights in decision processes, by disfavoring or disallowing certain types of vehicle behaviors.

In another example, a vehicle computing system can adjust costs of certain vehicle actions based at least in part on the user profile. The vehicle's motion planning system can consider one or more user profile preferences/attributes by modifying planning factor weights, for example, by adjusting a cost of certain routes due to speed of travel on one or more roads in a route, current route conditions, route types, number of turns, certain vehicle actions, etc. to implement the user profile preferences/attributes in the determinations.

In some implementations, the preferences/attributes in a user profile may be outweighed by other vehicle decisions. For example, in some embodiments, routing decisions may be based on a number of weighted factors, and the user preferences may be used to affect the routing decisions such as by adjusting one or more weighting factors. However, the user preferences may still be outweighed by other factors in the current moment when making routing decisions (e.g., in motion planning). For example, one or more user preferences (e.g., route preferences, driving style preferences, or the like) may be used to adjust some weighting factors for determining roads to use in routing a trip, but these adjusted factors may be outweighed by other factors, such as factors related to safety, temporary road conditions, or the like. Thus, while the user preferences may be considered when determining a routing plan, the user preferences may be overridden by other factors considered in the routing determination.

In some embodiments, the user profile preferences/settings may be temporarily modified or altered during a trip based on current circumstances and/or timing. For example, situations such as current traffic, ongoing construction, special events, rider safety, and/or the like may cause the autonomous vehicle to modify operation determinations from the user profile preferences, such as route preferences, driving style preferences, and the like. For example, some user profile preferences, such as vehicle environment (e.g., temperature, lighting, etc.), driving style, or the like, may be modified based on external conditions, such as the current weather, time of year (season), and/or the like. For example, if it is raining during a requested trip, a user's preferences for temperature or lighting may be adjusted based on the outside environmental conditions.

In some embodiments, a user may be informed of changes or modifications to the user's preferred settings, such as by displaying the changed settings or alternative options to the user in a user interface (e.g., on a display device), such as to maintain user transparency, for example. Additionally, in some embodiments, the user may be informed of the changes/modifications and possibly provided with options to accept or override the changed attributes/settings.

In some embodiments, there may be boundaries or limits established in regard to the settings/attributes that can be applied during a trip based on a user preference. In some embodiments, there may be limits on what attributes can be set by a user, for example in an application user interface. As one example, significant or extreme changes may be disallowed near the end of a trip due to a desire to quickly return to a default environment for a next trip. By way of example, a user profile temperature preference may be modified such that the vehicle environment would not get so cold toward the end of a trip that the vehicle could not quickly return to a default temperature setting in time for a next trip. Additionally, such boundaries or limits may be applied such that safety is not compromised, for example, in favor of arriving at a destination faster.

Additionally, in some embodiments, user profiles may be updated to reflect changes made during a trip, and a user's preferences may be adjusted based on such changes. For example, in some embodiments, data may be collected (e.g., by an operations computing system, etc.) regarding changes made by the user during a trip, for example, by receiving vehicle setting changes from a vehicle computing system, and the collected data may be used to update the user profile. By way of example, a user profile may store changes during a trip (for example, seat settings, temperature settings, entertainment settings, and/or the like) such that the user's next trip can be initiated using the last settings from the previous trip using an autonomous vehicle.

In some embodiments, user profiles may also include data to mitigate how user preferences may need to change across a vehicle fleet. As an example, there may be multiple types of vehicles within a fleet and some user preferences may be specific to only a subset of the types of vehicles in the fleet. In such instances, the user profile may include data to indicate the types of vehicle where one or more of the user preferences should be applied. For example, where a vehicle fleet has different size vehicles, a user may be more comfortable with particular driving styles or routes in larger vehicles than in smaller vehicles. The user profile can track these differing preferences such that the appropriate driving style or routing can be applied to the trip based on the vehicle deployed.

Additionally, in some embodiments, the user profile may be used with respect to various types of services provided by autonomous vehicles (e.g., in addition to rideshare services), such as a delivery or courier type of service and may alternatively be considered a "service" profile. For example, a user profile may be maintained by a courier service and preferences may be applied based on the type of trip being requested, such as a delivery trip, priority courier trip, or the like. In such embodiments, preference attributes may also include the type of delivery (e.g., hot food, cold food, fragile items, etc.), time sensitivity (e.g., fastest possible, etc.), desired efficiency, and/or the like, for example.

The systems and methods described herein may provide a number of technical effects and benefits. For instance, the use of user profiles to affect operations of an autonomous vehicle in accordance with the present disclosure provides for mitigating the gap between the actions of a human driver and an autonomous vehicle, thereby improving the autonomous vehicle-rider experience. Changing one or more operations of an autonomous vehicle through the use of user profiles can provide the benefit of a more personalized and improved experience for a user and provide a more efficient and frictionless vehicle setup for users.

The systems and methods described herein may also provide a technical effect and benefit of a more seamless experience for a user when using an autonomous vehicle. For example, the use of user profiles to modify operations can reduce the need for repetitive actions by a user for each trip using an autonomous vehicle. The use of user profiles can mitigate the need for a user to adjust a plurality of settings or attributes of the autonomous vehicle at the beginning of each trip and can provide for an easily customizable experience. For example, autonomous vehicles in a fleet may "remember" a user through the use of user profiles and easily provide a personalized experience by applying the user's preferences without much effort from the user.

Additionally, the systems and methods described herein may also provide a technical effect and benefit of aiding in the transition from the use of a personal vehicle to the use of shared autonomous vehicles. For example, a user could be provided the experience of having an autonomous vehicle preset with the user's preference upon arrival, similarly to the way a personal vehicle would have the user's preferences maintained from previous use. Using user profiles to change autonomous vehicle operations as described herein may also increase the comfort level for users who are transitioning to the use of autonomous vehicles.

The systems and methods described herein may also provide resulting improvements to computing technology tasked with operations of an autonomous vehicle, such as routing and user experience. For example, through the use of user profiles, a vehicle computing system may be able to optimize processing power and efficiency by making and/or coordinating determinations and adjustments based on user profile attributes. Further, a vehicle computing system may be provided with learnable opportunities that can be used to more easily personalize future user experiences through the development of user profiles.

With reference to the figures, example embodiments of the present disclosure will be discussed in further detail.

FIG. 1 depicts a block diagram of an example system 100 for controlling an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operating mode and/or a semi-autonomous operating mode. A fully autonomous (e.g., self-driving) operating mode can be one in which the autonomous vehicle can provide driving and navigational operation with minimal and/or no interaction from a human driver present in the vehicle. A semi-autonomous (e.g., driver-assisted) operating mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path. Additionally, in some implementations, the vehicle computing system 106 can obtain user profile data including one or more user preferences/settings (e.g., from a remote computing system) and apply the one or more user preference/settings in determining the autonomous vehicle's operation and/or behavior during a user's trip.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations, such as described herein. In some implementations, the one or more processors 130 and at least one memory 132 may be comprised in one or more computing devices, such as computing device(s) 129, within the vehicle computing system 106.

In some implementations, vehicle computing system 106 can further be connected to, or include, a positioning system 120. The positioning system 120 can determine a current position of the autonomous vehicle 102. The positioning system 120 can be any device or circuitry for analyzing the position of the autonomous vehicle 102. For example, the positioning system 120 can determine a current position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for a LIDAR system, the sensor data can include the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, the RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron);

class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations. Additionally, the motion planning system 114 can apply one or more user preferences/settings (e.g., based on user profile data obtained by the vehicle computing system 106) in determining a motion plan for the autonomous vehicle 102, as described herein.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway). Additionally, in some implementations, the cost described by a cost function can be adjusted based in part on one or more preferences/settings associated with a user profile, for example.

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan. Additionally, in some implementations, the vehicle computing system 106 can provide instructions to the vehicle controller 116 to apply user preferences/settings which can affect the behavior/operation of the autonomous vehicle using one or more vehicle controls 108 (e.g., to control vehicle environmental attributes, such as temperature, lighting, entertainment, etc., vehicle driving style attributes, and/or the like).

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
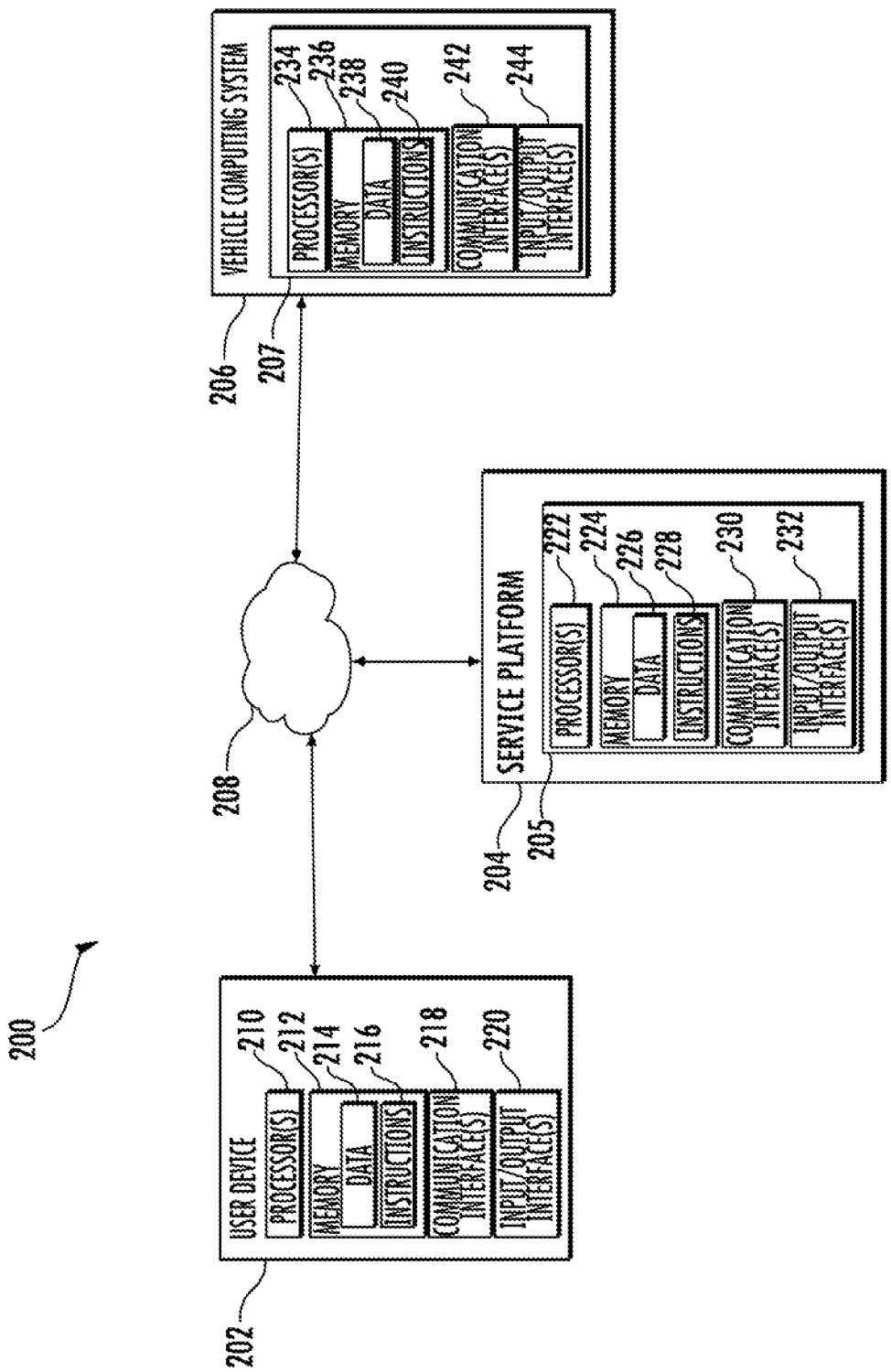
FIG. 2 depicts a block diagram of an example system according to example embodiments of the present disclosure.

FIG. 2 depicts a block diagram of an example system 200 according to example embodiments of the present disclosure. The example system 200 illustrated in FIG. 2 is provided as an example only. The components, systems, connections, and/or other aspects illustrated in FIG. 2 are optional and are provided as examples of what is possible, but not required, to implement the present disclosure. FIG. 2 illustrates an example system 200 including a service platform 204, vehicle computing system(s) 206, and user device(s) 202 that can be communicatively coupled to one another over one or more network(s) 208 and can provide one or more operations in accordance with example embodiments of the systems and methods of the present disclosure.

As illustrated, a user device 202 may provide a user with access to an application platform, such as a ride sharing platform, and allow the user to establish/maintain a user account for the application platform, request services associated with the application platform, and/or establish/maintain a user profile including preferences for the provided services. The user device 202 can be any type of computing device, such as, for example, a personal computing device (e.g., laptop or desktop), a mobile computing device (e.g., smartphone or tablet), a gaming console or controller, a wearable computing device, an embedded computing device, a personal assistant computing device, or any other type of computing device.

More particularly, the user device 202 can include one or more processor(s) 210 and at least one memory 212. The one or more processors 210 can be any suitable processing device (e.g., a processor core, a microprocessor, an ASIC, a FPGA, a controller, a microcontroller, etc.) and can be one processor or a plurality of processors that are operatively connected. The memory 212 can include one or more non-transitory computer-readable storage mediums, such as RAM, ROM, EEPROM, EPROM, flash memory devices, magnetic disks, etc., and combinations thereof. The memory 212 can store data 214 and computer-readable instructions 216 which are executed by the processor 210 to cause the user device 202 to perform operations, such as described herein. The instructions 216 can be software written in any suitable programming language or can be implemented in hardware. Additionally, or alternatively, the instructions 216 can be executed in logically and/or virtually separate threads on processor(s) 210.

In some implementations, the one or more processors 210 and at least one memory 212 may be comprised in one or more computing devices within the user device 202. In some implementations, the user device 202 can obtain data from one or more memory device(s) that are remote from the user device 202.

The user device 202 can also include one or more input/output interface(s) 220 that can be used to receive input, such as from a user, and provide output, such as for display to a user. The input/output interface(s) 220 can include, for example, devices for receiving information from or providing information to a user, such as a display device, touch screen, touch pad, mouse, data entry keys, an audio output device such as one or more speakers, a microphone, haptic feedback device, etc. The input/output interface(s) 220 can be used, for example, by a user to control operation of the user device 202.

The user device 202 can also include one or more communication interface(s) 218 used to communicate with one or more systems or devices, including systems or devices that are remotely located from the user device 202, such as service platform 204 and/or the like, for example. The communication interface(s) 218 can include any circuits, components, software, etc. for communicating with one or more networks (e.g., network 208). In some implementations, the communication interface(s) 218 can include, for example, one or more of a communications controller, receiver, transceiver, transmitter, port, conductors, software, and/or hardware for communicating data.

The network(s) 208 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 208 can be accomplished, for instance, via a communication interface using any type of protocol, protection scheme, encoding, format, packaging, etc.

As further illustrated, the system 200 can include a service platform 204 which can provide services for an application platform, such as a ride sharing platform. For example, the service platform 204 can communicate with one or more user devices 202 to provide user access to an application platform. The service platform 204 can also communicate with one or more vehicle computing systems 206 to provision services associated with an application platform, such as a ride sharing platform, delivery service platform, courier service platform, and/or other service platform. The service platform 204 can be associated with a central operations system and/or an entity associated with an autonomous vehicle and/or application platform such as, for example, a vehicle owner, vehicle manager, fleet operator, service provider, etc.

More particularly, the service platform 204 can include one or more computing device(s) 205 to perform operations associated with an application platform. The computing device(s) 205 can include one or more processor(s) 222 and at least one memory 224. The one or more processors 222 can be any suitable processing device (e.g., a processor core, a microprocessor, an ASIC, a FPGA, a controller, a microcontroller, etc.) and can be one processor or a plurality of processors that are operatively connected. The memory 224 can include one or more non-transitory computer-readable storage mediums, such as RAM, ROM, EEPROM, EPROM, flash memory devices, magnetic disks, etc., and combinations thereof.

The memory 224 can store data 226 and computer-readable instructions 228 which are executed by the processor 222 to cause the computing device(s) 205 to perform operations such as described herein. The instructions 228 can be software written in any suitable programming language or can be implemented in hardware. Additionally, or alternatively, the instructions 228 can be executed in logically and/or virtually separate threads on processor(s) 222. For example, the memory 224 can store instructions 228 that when executed by the one or more processors 222 cause the one or more processors 222 to perform any of the operations and/or functions described herein, including, for example, one or more operations of FIG. 5 through FIG. 8. Additionally, in some implementations, the memory 224 can store data 226 which can include user profile data such as described herein and the service platform 204 can provide at least some portion of the user profile data to one or more remote computing systems, such as a vehicle computing system in an autonomous vehicle (e.g., vehicle computing system 206), for example.

In some implementations, the one or more processors 222 and at least one memory 224 may be comprised in one or more computing devices within the service platform 204. In some implementations, the service platform 204 can obtain data from one or more memory device(s) that are remote from the service platform 204.

The one or more computing device(s) 205 included in service platform 204 can also include one or more input/output interface(s) 232 that can be used to receive input, such as from a user, and provide output, such as for display to a user. The input/output interface(s) 232 can include, for example, devices for receiving information from or providing information to a user, such as a display device, touch screen, touch pad, mouse, data entry keys, an audio output device such as one or more speakers, a microphone, haptic feedback device, etc. The input/output interface(s) 232 can be used, for example, by a user to control operation of the computing device(s) 205 included in service platform 204.

The computing device(s) 205 can also include one or more communication interface(s) 230 used to communicate with one or more systems or devices, including systems or devices that are remotely located from the computing device(s) 205, such as a user device 202, a vehicle computing system 206, and/or the like, for example. The communication interface(s) 230 can include any circuits, components, software, etc. for communicating with one or more networks (e.g., network 208). In some implementations, the communication interface(s) 230 can include, for example, one or more of a communications controller, receiver, transceiver, transmitter, port, conductors, software, and/or hardware for communicating data.

In some implementations, the service platform 204 can include one or more server computing devices. If the service platform 204 includes multiple server computing devices, such server computing devices can operate according to various computing architectures, including, for example, sequential computing architectures, parallel computing architectures, or some combination thereof.

As further illustrated, the system 200 can include a vehicle computing system 206 (e.g., included in an autonomous vehicle such as autonomous vehicle 102 of FIG. 1) can provide operations for controlling an autonomous vehicle. In some implementations, the vehicle computing system 206 can perform autonomous vehicle motion planning and enable operation of an autonomous vehicle, as described herein. Additionally, in some implementations, the vehicle computing system 206 can receive at least some portion of user profile data associated with a user from a remote computing system, such as service platform 204 for example, to apply in determining the operation and/or behavior of the autonomous vehicle, as described herein.

More particularly, the vehicle computing system 206 can include one or more computing device(s) 207 to perform operations associated with an autonomous vehicle. The computing device(s) 207 can include one or more processor(s) 234 and at least one memory 236. The one or more processor(s) 234 can be any suitable processing device (e.g., a processor core, a microprocessor, an ASIC, a FPGA, a controller, a microcontroller, etc.) and can be one processor or a plurality of processors that are operatively connected. The memory 236 can include one or more non-transitory computer-readable storage mediums, such as RAM, ROM, EEPROM, EPROM, flash memory devices, magnetic disks, etc., and combinations thereof.

The memory 236 can store data 238 and computer-readable instructions 240 which are executed by the processor(s) 234 to cause the computing device(s) 207 to perform operations such as described herein, including applying one or more preferences/settings associated with a user profile to affect the operation/behavior of the autonomous vehicle before/during a trip, for example. The instructions 240 can be software written in any suitable programming language or can be implemented in hardware. Additionally, or alternatively, the instructions 240 can be executed in logically and/or virtually separate threads on processor(s) 234. For example, the memory 236 can store instructions 240 that when executed by the one or more processor(s) 234 cause the one or more processor(s) 234 to perform any of the operations and/or functions described herein, including, for example, one or more operations of FIG. 5 through FIG. 8.

In some implementations, the one or more processor(s) 234 and at least one memory 236 may be comprised in one or more computing devices within the vehicle computing system 206. In some implementations, the vehicle computing system 206 can obtain data from one or more memory device(s) that are remote from the vehicle computing system 206.

The one or more computing device(s) 207 included in vehicle computing system 206 can also include one or more input/output interface(s) 244 that can be used to receive input, such as from a user, and provide output, such as for display to a user. The input/output interface(s) 244 can include, for example, devices for receiving information from or providing information to a user, such as a display device, touch screen, touch pad, mouse, data entry keys, an audio output device such as one or more speakers, a microphone, haptic feedback device, etc. The input/output interface(s) 244 can be used, for example, by a user to control operation of the computing device(s) 207 included in vehicle computing system 206.

The computing device(s) 207 can also include one or more communication interface(s) 242 used to communicate with one or more systems or devices, including systems and devices on-board an autonomous vehicle as well as systems or devices that are remotely located from the computing device(s) 207 and/or the autonomous vehicle, such as service platform 204 and/or the like, for example. The communication interface(s) 242 can include any circuits, components, software, etc. for communicating with one or more networks (e.g., network 208). In some implementations, the communication interface(s) 242 can include, for example, one or more of a communications controller, receiver, transceiver, transmitter, port, conductors, software, and/or hardware for communicating data.

Figure 3:
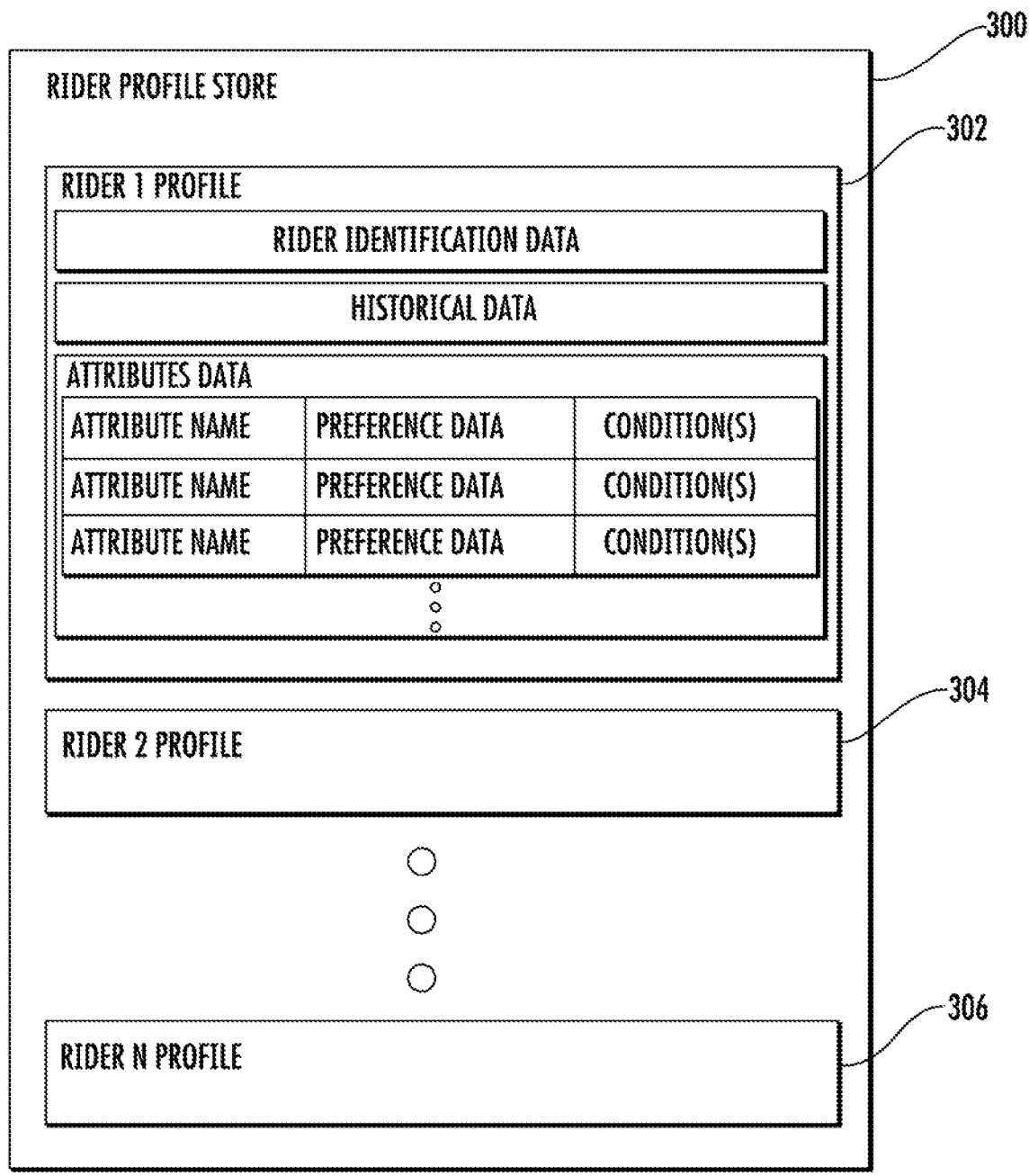
FIG. 3 depicts an example of a user profile data structure according to example embodiments of the present disclosure.

FIG. 3 depicts an example of a user profile data store 300 according to example embodiments of the present disclosure. In particular, in some implementations, an operations computing system (e.g., a computing system of an entity associated with an autonomous vehicle) can generate a user profile associated with a particular user. For example, information that can be used in generating and/or maintaining a user profile may be collected from one or more application platforms, such as a ride sharing application platform, from one or more vehicle computing systems, or directly from a user (for example, through an application user interface presented on a user device). For example, the user may provide user input into a user device to provide information to be stored within a user profile. A user profile may be generated for a user and the user profile may be associated with, or alternatively be a part of, the user account for an application platform, such as a ride sharing application platform, for example. Additionally, in some embodiments, the application platform may be associated with an entity associated with the autonomous vehicle (e.g., the owner of the autonomous vehicle, the managing entity of a fleet including the autonomous vehicle, etc.).

More particularly, FIG. 3 illustrates an example user profile data store 300 that may be used to store preferences/attributes for multiple users that are related to services associated with an application platform, such as a ride sharing service. In some embodiments, a user profile may be generated for a user after the user has established a user account on an application platform and the user profile data store 300 can be used to store and organize the users' data, in some embodiments.

As illustrated in FIG. 3, the user profile data store 300 can include one or more user profiles (e.g., user profiles 302, 304, and 306) for users of an application platform, such as a ride sharing platform. A user profile 302, 304, 306 can include various data associated with the user and with the user's use of services provided by the application platform. For example, in some embodiments, the user profile 302 can include user identification data to uniquely identify a user within the application platform. As one example, the user identification data may be associated with the user's account on the application platform and can be securely stored. User profiles 304 and 306 can include the same structure and type of data as user profile 302 and as such will not be described in detail for the sake of brevity.

Additionally, the user profile 302 can include various historical data associated with the user's use of the services provided by the application platform and autonomous vehicles, such as prior request and/or trip histories, for example. The user profile 302 can include data for a number of attributes that identify the user preferences for settings and behavior/operation of an autonomous vehicle providing services to the user. As an example, the user profile 302 can include a data structure including the names, types, and/or categories of each user preference/attribute stored for a user, the setting indications for each user preference/attribute, and, in some instances, one or more conditions associated with a user preference/attribute.

In particular, for each user preference/attribute stored for a user, the user profile 302 can include one or more indications of a user's preference setting. For example, user profiles may include preferences or attributes for one or more of music settings/entertainment preference (e.g., quiet mode, music, news, or the like), environment preferences (e.g., temperature, lighting, scents, etc.), driving style (e.g., aggressive, passive, etc.), driving characteristics (e.g., braking, acceleration, turning, lane changes, avoid left lane, etc.), autonomous vehicle comfort level, route preferences (e.g., highway versus local streets versus backroads, specific streets to use or avoid, etc.), favored/disfavored routes, stops made during trips (for example, restaurants, stores, sites, etc.), driving modes (e.g., fastest possible, slow routes, etc.), travel modes (e.g., tourist, scenic, business, etc.), voice control preferences (e.g., character, tone, volume, etc.), side-of-car preference, vehicle settings (e.g., seat position, etc.), preferred vehicle, and/or the like.

Additionally, in some embodiments, the user profile 302 can include one or more conditions associated with one or more of the user preferences/attributes. For example, in some embodiments, user profile 302 may include day and time of day information associated with one or more user preferences/attributes, such as preferences associated with a work commute versus social trips, weekday preferences versus weekend preferences, etc. As another example, the user profile 302 may also include seasonal information/conditions associated with one or more user preferences/attributes, such as vehicle environment preferences during winter versus vehicle environment preferences during summer and the like.

Figure 4:
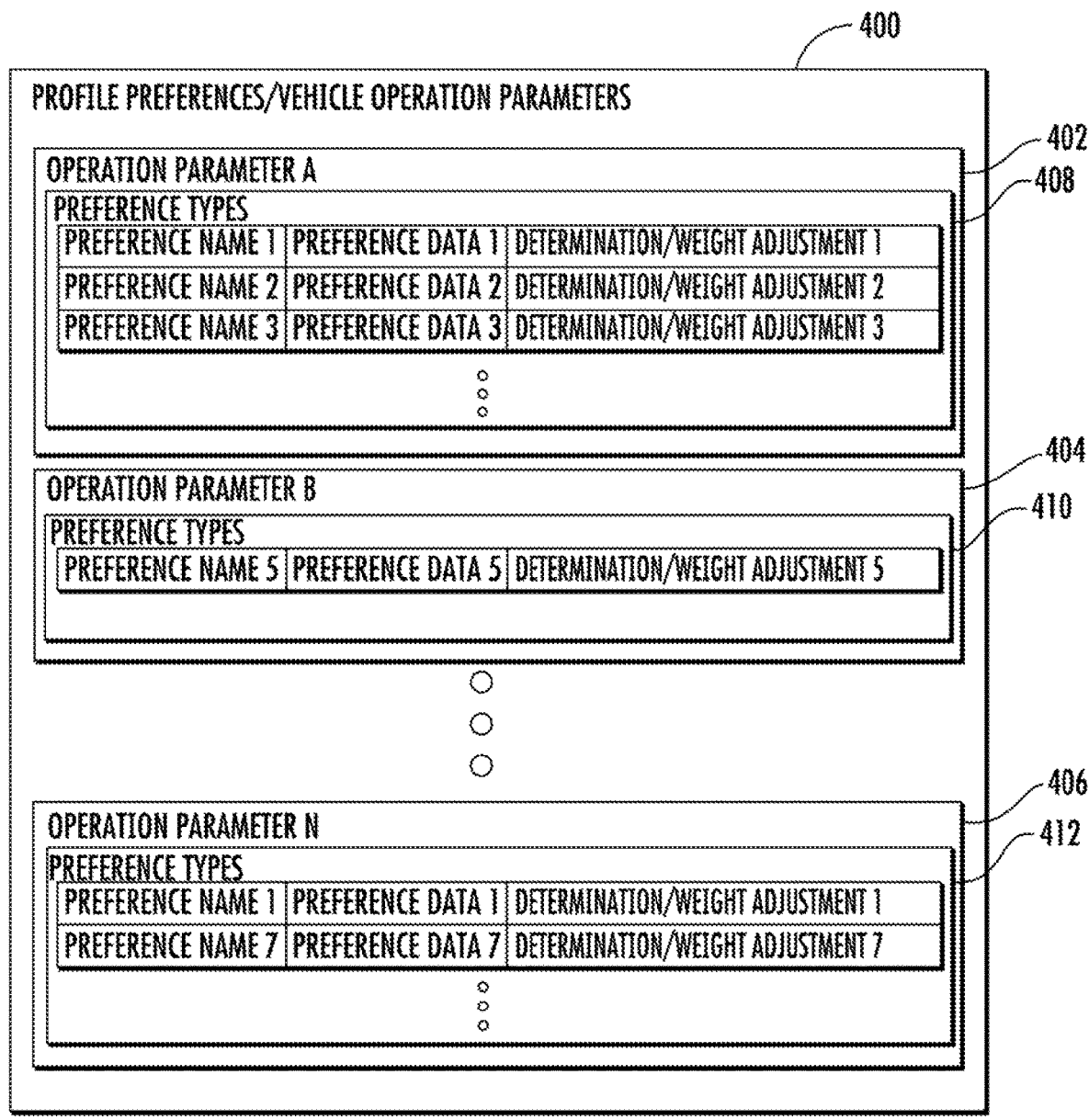
FIG. 4 depicts an example of a vehicle operating parameter data structure according to example embodiments of the present disclosure.

FIG. 4 depicts an example of a vehicle operating parameter structure 400 according to example embodiments of the present disclosure. In some embodiments, a computing system, such as may be included in an application platform or an autonomous vehicle, can include data indicating autonomous vehicle behavior and/or operating parameter determinations that may be affected or modified based at least in part on a user profile's preferences and/or attributes.

In particular, in some embodiments, a computing system can include preference/operation parameter data 400. In some embodiments, the preference/operation parameter data 400 can include data which maps one or more user profile preferences/attributes to one or more operation parameters for an autonomous vehicle. For example, preference/operation parameter data 400 can include one or more operation parameters, such as operation parameters 402, 404, and 406 that may provide indications of autonomous vehicle operations that can be affected or modified based on user profile preferences/attributes.

In an example, operation parameter 402 can indicate an operation parameter A, such as travel speeds, braking style, turn style, and/or the like, where one or more user profile preferences/attributes may be used to determination changes to the operation parameter A during a requested service/trip for a user. In particular, the one or more preference indications 408 for operation parameter 402 may include fields such as the preference type/name, preference data, and indications of how the parameter/attribute should be used in determining changes for the operation parameter 402. As an example, in some embodiments, user profile preferences (e.g., preference indications 408) such as driving style and/or rider comfort level preferences may be mapped to the determination of vehicle operation parameters (e.g., operation parameter 402) such as travel speed, braking style, turning style, and/or the like. Such operation parameters can be defined as ranges (e.g., speed range), limits (e.g., on deceleration rate), etc. The operation parameters can be translated into parameters that can be used by a motion planning system and/or a vehicle controller for implementing such operating parameters, after selection for a motion plan. In such embodiments, the user profile preferences/attributes can be considered in the determination of the behavior or operation of the autonomous vehicle, for example, by adjusting factor weights in decision processes and/or by disfavoring or disallowing certain types of vehicle behaviors (e.g., as indicated in a determination/weight adjustment field, for example).

Operation parameters 404 and 406 can include the same structure and/or type of data as operation parameter 402, such as preference indications 410 or 412 which may include one or more preferences associated with the operation parameters 404 or 406, and as such will not be described in detail for the sake of brevity.

Figure 5:
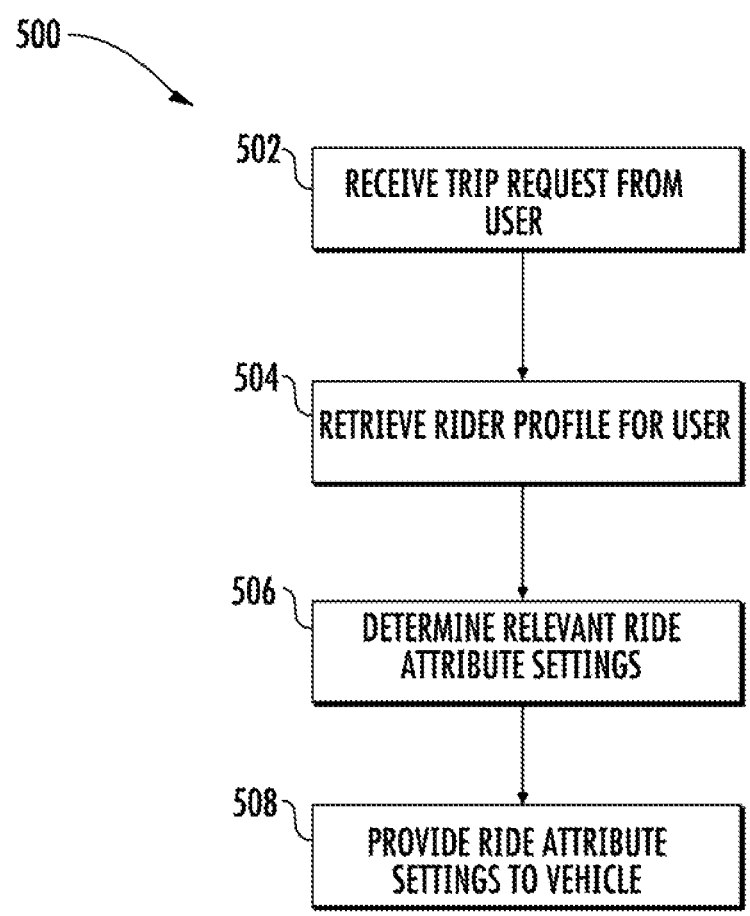
FIG. 5 depicts a flowchart diagram of an example method of applying a user profile for determining operation of an autonomous vehicle according to example embodiments of the present disclosure.

FIG. 5 depicts a flowchart diagram of an example method 500 of applying a user profile for determining operation of an autonomous vehicle according to example embodiments of the present disclosure. One or more portion(s) of the method 500 can be implemented by one or more computing devices such as, for example, the computing device(s) 205 within service platform 204 of FIG. 2, the vehicle computing system 106 of FIG. 1, or computing system 902 of FIG. 9. Moreover, one or more portion(s) of the method 500 can be implemented as an algorithm on the hardware components of the device(s) described herein (e.g., as in FIGS. 1, 2, and 9) to, for example, determine autonomous vehicle operation based on user profiles.

At 502, one or more computing devices included within a computing system can receive a trip request from a user (e.g., rider, delivery service, courier, etc.). For example, a user may submit a request for service, such as a rideshare trip, delivery trip, courier trip, or the like, through an application platform, such as a ride sharing platform, delivery service platform, courier service platform, or the like. Such request can be provided via a user device 202 to a computing system of an entity associated with an autonomous vehicle 102 (e.g., an operations computing system).

At 504, the computing system can retrieve a user profile associated with the user based in part on the trip request. For example, a user profile may be generated for a user and the user profile may be associated with, or alternatively be a part of, the user account for an application platform, such as a ride sharing application platform delivery service platform, courier service platform, or the like, for example. In one example, the computing system can retrieve all or part of the user profile data associated with the user on the application platform. In some embodiments, the user profile can contain preferences, attributes, and/or settings associated with a user that can be used to determine the operation of an autonomous vehicle during a particular trip. As an example, a user profile can include data regarding one or more of a user's trip/service history, preferences for certain routes, highways, and/or stops (e.g., highways versus local streets, favored/disfavored routes, stops at certain stores, restaurants, etc.), driving style preferences (e.g., aggressive, passive, etc.), driving characteristics (e.g., braking, acceleration, turning, lane changes, etc.), preferred vehicle settings (e.g., entertainment, lighting, temperature, seat position, voice control settings, etc.), vehicle type preferences (e.g., larger vehicle, smaller vehicle, etc.), driving modes (e.g., fastest possible, slow moving, etc.), autonomous vehicle comfort level (e.g., novice rider, experienced rider, etc.), travel modes (e.g., tourist, scenic routes, business, etc.), and/or the like.

At 506, the computing system can determine one or more attribute settings relevant to the requested trip from the user profile. For example, in some embodiments, one or more relevant user profile preferences/attributes may be determined from the user profile based at least in part on a type of requested trip, a vehicle type to be deployed for the requested trip, the timing of the trip (e.g., day of the week, time of day, time of year, etc.), and/or the like.

At 508, the computing system can provide the determined user profile preferences/attributes to be applied in the determination of the autonomous vehicle operation. As an example, in some implementations, the computing system may provide the determined user profile preferences/attributes to an autonomous vehicle, such as to a vehicle computing system, for use in determining the operation of the autonomous vehicle during the requested trip. In some embodiments, the determined user profile preferences/attributes may be provided to the autonomous vehicle once the autonomous vehicle has been selected or deployed for the requested trip and the autonomous vehicle may apply the preferences/attributes of the user profile shortly before or when arriving to the user. For example, preferences/attributes such as route preferences, driving characteristics, driving styles, environment preferences, and/or the like may be applied shortly before or as the autonomous vehicle arrives to the user, to enable a personalized trip for the user. Additionally, or alternatively, the autonomous vehicle may apply or adjust one or more relevant preferences/attributes at any time during the requested trip. For example, preferences/attributes such as environment preferences, route preferences, driving characteristics, and/or the like may be applied at any time during the trip as the trip progresses or as conditions during the trip change, for instance. Additionally, in some implementations, the computing system can apply the determined user profile preferences/attributes in the determination of an autonomous vehicle to be deployed for the requested trip. For example, preferences/attributes such as vehicle type preferences, routing preferences, driving style, driving characteristics, and/or the like may be applied in determining an autonomous vehicle to be deployed for a particular trip.

Figure 6:
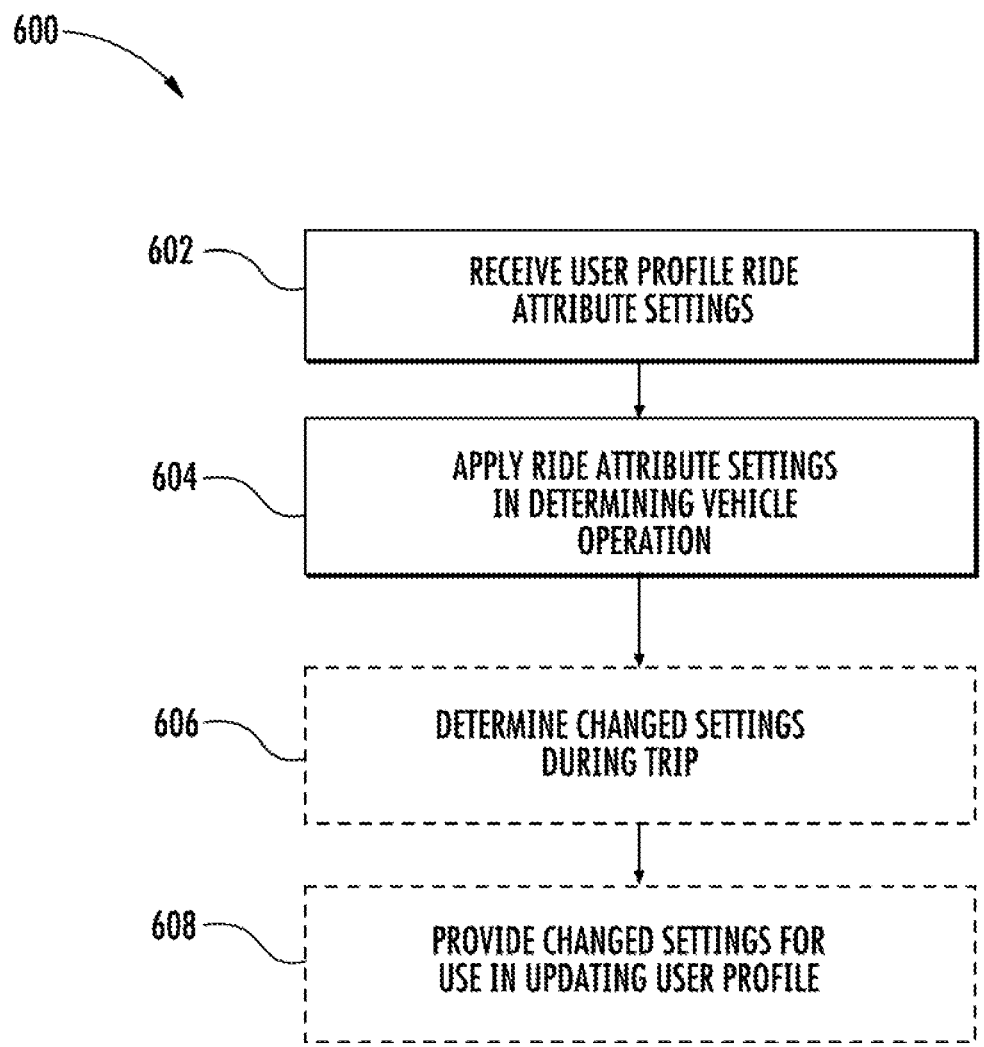
FIG. 6 depicts a flowchart diagram of an example method of applying a user profile during operation of an autonomous vehicle according to example embodiments of the present disclosure.

FIG. 6 depicts a flowchart diagram of an example method 600 of applying a user profile during operation of an autonomous vehicle according to example embodiments of the present disclosure. One or more portion(s) of the method 600 can be implemented by one or more computing devices such as, for example, the computing device(s) 205 within service platform 204 of FIG. 2, the vehicle computing system 106 of FIG. 1, the vehicle computing system 206 of FIG. 2, or computing system 902 of FIG. 9. Moreover, one or more portion(s) of the method 600 can be implemented as an algorithm on the hardware components of the device(s) described herein (e.g., as in FIGS. 1, 2, and 9) to, for example, determine autonomous vehicle operation based on user profiles.

At 602, one or more computing devices included within a computing system can receive user profile preferences/attributes associated with a user that are to be applied in determining the operation of an autonomous vehicle. For example, the user profile preferences/attributes can be provided to an autonomous vehicle (e.g., to the vehicle computing system of an autonomous vehicle) when it is selected or deployed in response to the trip request (e.g., once the autonomous vehicle has confirmed the request). For example, the user preferences/attributes received by the autonomous vehicle can be one or more of music settings/entertainment preference (e.g., quiet mode, music, news, or the like), environment preferences (e.g., temperature, lighting, scents, etc.), driving style (e.g., aggressive, passive, etc.), driving characteristics (e.g., braking, acceleration, turning, lane changes, avoid left lane, etc.), autonomous vehicle comfort level, driving modes (e.g., fastest possible, slow routes, etc.), route preferences (e.g., highway versus local streets versus backroads, specific streets to use or avoid, etc.), favored/disfavored routes, stops made during trips (for example, restaurants, stores, sites, etc.), travel modes (e.g., tourist, scenic, business, etc.), voice control preferences (e.g., character, tone, volume, etc.), side-of-car preference, vehicle settings (e.g., seat position, etc.), preferred vehicle, and/or the like.

At 604, the computing system can apply the user profile preferences/attributes in determining the operation of the autonomous vehicle during the requested trip. For instance, the computing system may provide for configuring one or more vehicle settings, such as temperature, lighting, entertainment, seat positioning, and/or the like, for the user during the requested trip. By way of example, a vehicle computing system can provide one or more control signals to other onboard systems of the vehicle (e.g., vehicle controls 108 of FIG. 1 and/or the like) that control these various aspects (e.g., temperature control, lighting control, sound system, automatic seat control, etc.) to adjust the parameters/settings of that aspect and implement the preference in accordance with the user profile.

In another example, the computing system may provide for applying one or more of the user profile preferences/attributes in determining operation of the autonomous vehicle in regard to motion planning, such as applying preferences/attributes regarding driving style, driving characteristics, route preferences, and the like in making routing decisions or determining autonomous vehicle behavior during the requested trip. Additionally, as an example, the autonomous vehicle may apply the preferences/attributes in determinations of the operation of the autonomous vehicle shortly before or when arriving to the user. Additionally, or alternatively, the autonomous vehicle may apply the one or more relevant preferences/attributes in determinations of the operation of the autonomous vehicle at any time during the requested trip. For example, the preferences/attributes can be applied by implementing and/or modifying the vehicle operating parameters associated with the preferences/attributes (indicated in the user profile). The computing system of the autonomous vehicle can receive data indicative of the user profile and/or the preferences/attributes. The computing system can identify the operating parameters associated with the preferences/attributes to be applied, for example, via a data structure, as described herein. The computing system can provide one or more control signals to one or more systems onboard the autonomous vehicle (e.g., motion planning system, vehicle controller, etc.) to change and/or initiate the operating parameters accordingly.

Optionally, in some embodiments, at 606, a computing system may determine settings that are changed during a requested trip that may be associated with one or more user profile preferences/attributes. For example, the computing system may identify changes to vehicle settings such as seat position, entertainment choices, temperature, lighting, or the like, that are made/requested by the user during the requested trip. As an example, in some implementations, one or more components onboard the autonomous vehicle may detect changes to vehicle features and provide indications of these changes to the vehicle computing system. The vehicle computing system can monitor and record the position and/or state of various vehicle features based on the change indications and store the position and/or state onboard or provide for off-board storage of the data. The position and/or state data can be provided to a computing system, such as an application platform, to be associated with the user profile.

At 608, the computing system may provide the identified setting changes for use in updating the user profile. For example, setting changes identified during a trip may be stored to the user profile and may optionally be used to adjust the stored preferences/attributes. Additionally or alternatively, the identified changes may be stored to a user profile and identified as last settings which may be applied or suggested as optional settings for a next requested trip.

Figure 7:
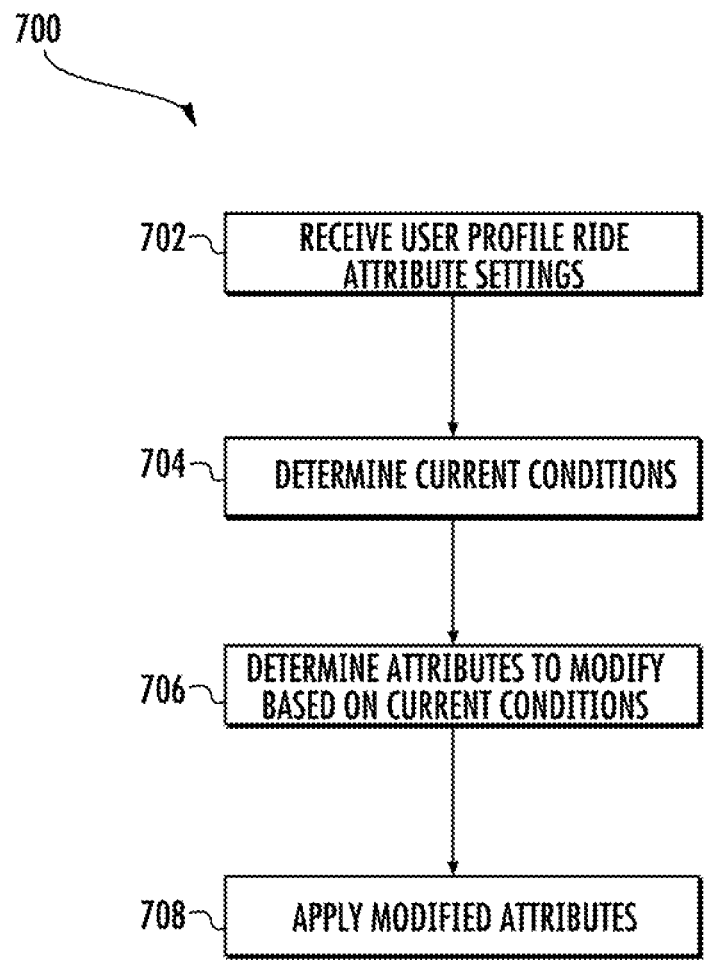
FIG. 7 depicts a flowchart diagram of another example method of applying a user profile according to example embodiments of the present disclosure.

FIG. 7 depicts a flowchart diagram of another example method 700 of applying a user profile according to example embodiments of the present disclosure. One or more portion(s) of the method 700 can be implemented by one or more computing devices such as, for example, the computing device(s) 205 within service platform 204 of FIG. 2, the vehicle computing system 106 of FIG. 1, the vehicle computing system 206 of FIG. 2, or computing system 902 of FIG. 9. Moreover, one or more portion(s) of the method 700 can be implemented as an algorithm on the hardware components of the device(s) described herein (e.g., as in FIGS. 1, 2, and 9) to, for example, determine autonomous vehicle operation based on user profiles.

At 702, one or more computing devices included within a computing system can receive user profile preferences/attributes associated with a user and apply the user profile preferences/attributes in determining the operation of the autonomous vehicle during a requested trip. For example, the user profile preferences/attributes can be provided to an autonomous vehicle (e.g., to the vehicle computing system of an autonomous vehicle) by a computing system of an entity associated with the autonomous vehicle 102 (e.g., an operations computing system) when it is selected or deployed in response to the trip request (e.g., once the autonomous vehicle has confirmed the request). The user profile preferences/attributes can be applied at/by the autonomous vehicle during the requested trip. For instance, the computing system may provide for configuring one or more vehicle settings or implementing one or more vehicle operation/behavior determinations based on the preferences/attributes. As an example, a vehicle computing system can provide one or more control signals to other onboard systems of the vehicle that control various aspects of the autonomous vehicle to adjust the parameters/settings of the aspects and implement the preferences/attributes.

As an example, the user preferences/attributes received by the autonomous vehicle can be one or more of music settings/entertainment preference (e.g., quiet mode, music, news, or the like), environment preferences (e.g., temperature, lighting, scents, etc.), driving style (e.g., aggressive, passive, etc.), driving characteristics (e.g., braking, acceleration, turning, lane changes, avoid left lane, etc.), driving modes (e.g., fastest possible, slow routes, etc.), autonomous vehicle comfort level, route preferences (e.g., highway versus local streets versus backroads, specific streets to use or avoid, etc.), favored/disfavored routes, stops made during trips (for example, restaurants, stores, sites, etc.), travel modes (e.g., tourist, scenic, business, etc.), voice control preferences (e.g., character, tone, volume, etc.), side-of-car preference, vehicle settings (e.g., seat position, etc.), preferred vehicle, and/or the like.

At 704, the computing system can determine one or more current conditions during the requested trip. For example, the computing system can receive information regarding current weather/environmental conditions, current traffic conditions, safety conditions, temporary road conditions, special events, remaining trip time, and/or the like. As an example, a computing system of an entity associated with the autonomous vehicle 102 (e.g., an operations computing system) can provide updated conditions, such as traffic, route conditions, events, weather conditions, and/or the like, to the computing system (e.g., vehicle computing system of the autonomous vehicle) during the requested trip. As another example, the computing system (e.g., vehicle computing system of the autonomous vehicle) can receive current condition information, such as weather, road conditions, traffic, and/or the like, from one or more systems onboard the autonomous vehicle, such as one or more sensors, traffic monitoring systems, weather monitoring systems, and/or the like.

At 706, the computing system can determine one or more of the applied user profile preferences/attributes that should be modified based on the current conditions. For example, the computing system may determine that user profile preferences/attributes such as routing preferences, driving style, or the like, should be modified due to current conditions. As one example, road construction, a special event, or the like may make some preferred routes undesirable, and thus those preferences should be modified in making determinations for the autonomous vehicle operation during the trip.

As another example, current weather conditions, such as rain or snow, may initiate modifications to a user's vehicle setting preferences such as temperature, lighting, and the like. For instance, one or more sensors may provide data regarding external conditions (e.g., temperature, precipitation, lidar data, camera data, etc.) to the computing system (e.g., vehicle computing system of the autonomous vehicle) which can be used to detect current weather conditions that may call for modification of current vehicle settings during the trip such that the vehicle computing system can determine and provide control signals to modify the settings accordingly.

As another example, the computing system may determine that a vehicle setting, such as temperature for example, should be modified based on the remaining trip time. For instance, the computing system (e.g., vehicle computing system of the autonomous vehicle) can monitor remaining trip time for use in determining any vehicle settings that may need to be adjusted to return the autonomous vehicle to a default state at the end of the trip. For example, the computing system may determine based on remaining trip time that a temperature setting should be increased (e.g., in incremental amounts over the remaining trip time) to return the autonomous vehicle to a default temperature as soon as the trip is completed.

Additionally, in some embodiments, a user may be informed of changes or modifications, such as by displaying changes or options to the user in a user interface, for example. The user interface can be provided to the user by a display device of a user device that is associated with the user. The user interface can be provided, in some implementations, via a software application associated with the service platform. In some embodiments, the user could be informed of the changes/modifications, and possibly provided with options to accept or override the attributes/settings changes.

At 708, the user profile preference/attribute modifications can be applied at/by the autonomous vehicle during the requested trip. For instance, the computing system may provide for configuring one or more vehicle settings, such as temperature, lighting, entertainment, seat positioning, and/or the like, or implementing one or more vehicle operation/behavior determinations based on the modifications. By way of example, a vehicle computing system can provide one or more control signals to other onboard systems of the vehicle (e.g., vehicle controls 108 of FIG. 1 and/or the like) that control these various aspects (e.g., temperature control, lighting control, sound system, automatic seat control, etc.) to adjust the parameters/settings of that aspect and implement the preference/attribute modification.

Figure 8:
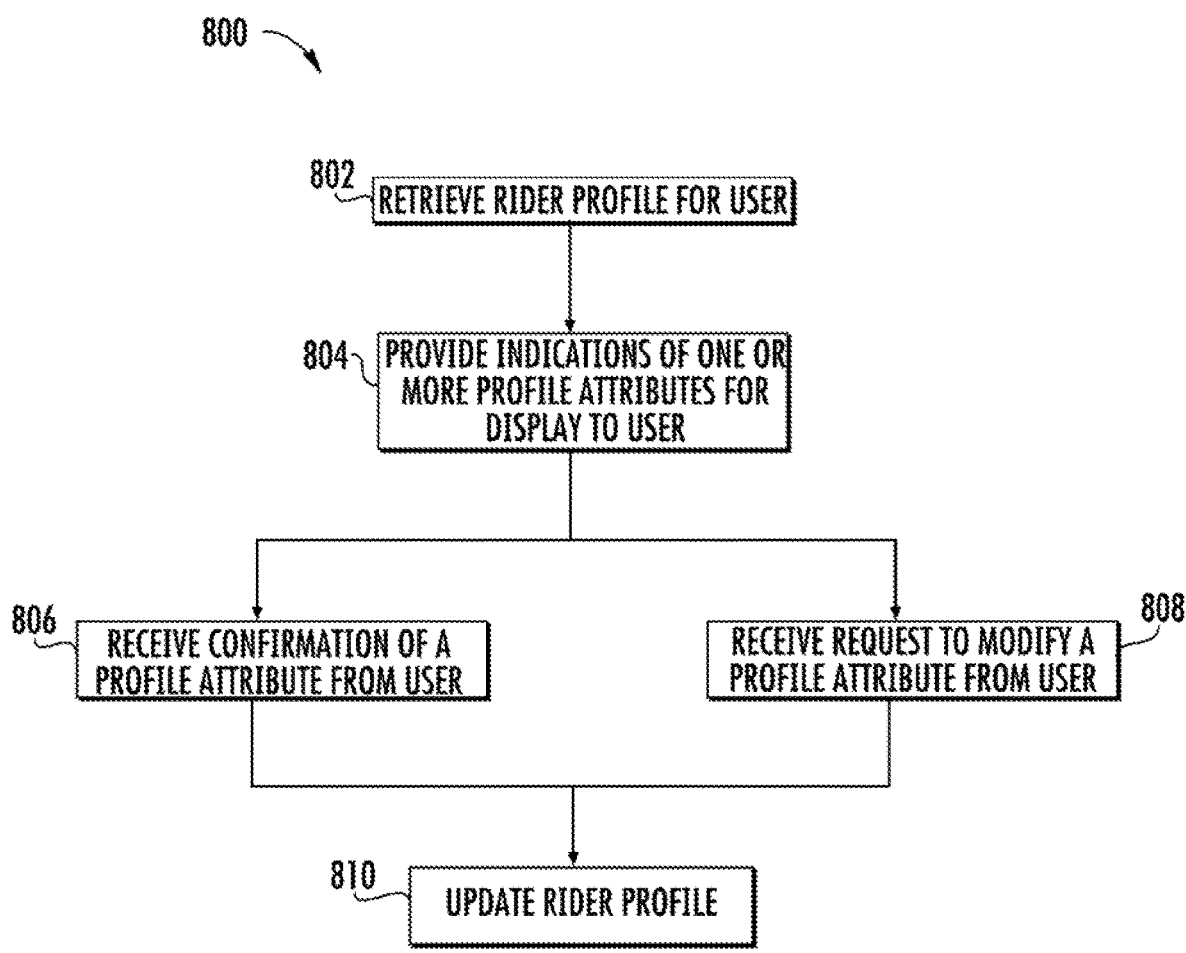
FIG. 8 depicts a flowchart diagram of an example method of maintaining a user profile according to example embodiments of the present disclosure.

FIG. 8 depicts a flowchart diagram of an example method 800 of maintaining a user profile according to example embodiments of the present disclosure. One or more portion(s) of the method 800 can be implemented by one or more computing devices such as, for example, the user device 202 of FIG. 2, the computing device(s) 205 within service platform 204 of FIG. 2, the vehicle computing system 106 of FIG. 1 or 206 of FIG. 2, or computing system 902 of FIG. 9. Moreover, one or more portion(s) of the method 800 can be implemented as an algorithm on the hardware components of the device(s) described herein (e.g., as in FIGS. 1, 2, and 9) to, for example, provide for maintaining user profiles used in determining autonomous vehicle operation.

At 802, one or more computing devices included within a computing system can retrieve a user profile associated with a user, for example, associated with a the user account for an application platform, such as a ride sharing application platform. For example, a user may request access to their user profile to review and/or modify preferences/attributes or a user may be presented with their user profile while participating in a requested trip in an autonomous vehicle.

At 804, the computing system can provide for display of all or part of the user profile preference/attribute settings, for example, using a graphical user interface on a mobile device or vehicle display device in some embodiments.

At 806, the computing system may receive a confirmation of a preference/attribute setting from the user after the user views the displayed user profile preference/attribute setting. Alternatively, at 808, the computing system may receive a modification to the displayed preference/attribute setting from the user. As an example, in some embodiments, a user profile can include some preference/attribute settings that can be directly modified by the user, for example through a graphical user interface, and can also include preference/attribute settings that cannot be modified by the user.

At 810, the computing system can update the user profile. For example, the computing system can update the user profile to indicate that one or more user profile preference/attribute settings were confirmed by the user. Additionally, or alternatively, the computing system can store the one or more modified user profile preference/attribute settings.

Although FIGS. 5 through 8 depict steps performed in a particular order for purposes of illustration and discussion, the methods of the present disclosure are not limited to the particularly illustrated order or arrangement. The various steps of the methods 500, 600, 700, and 800 can be omitted, rearranged, combined, and/or adapted in various ways without deviating from the scope of the present disclosure.

Figure 9:
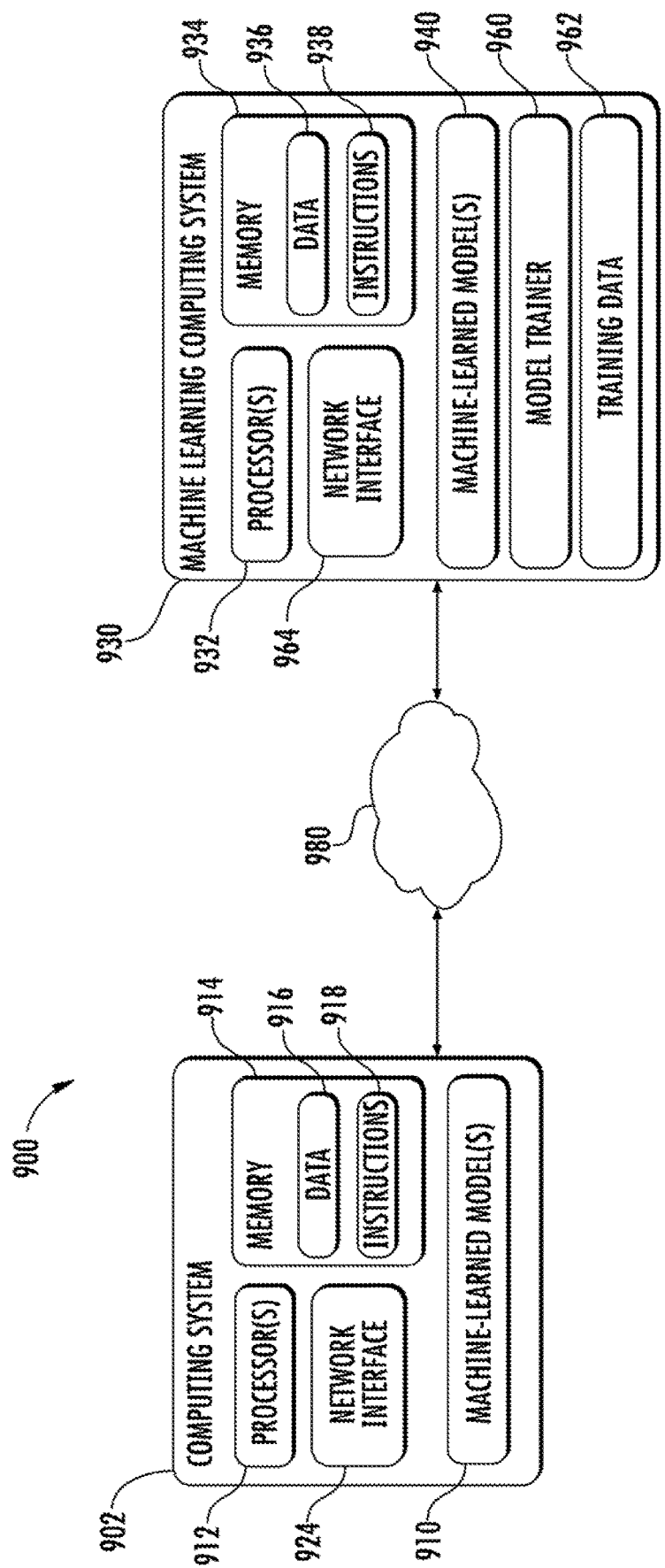
FIG. 9 depicts a block diagram of an example computing system according to example embodiments of the present disclosure.

FIG. 9 depicts a block diagram of an example computing system 900 according to example embodiments of the present disclosure. The example system 900 includes a computing system 902 and a machine learning computing system 930 that are communicatively coupled over a network 980.

In some implementations, the computing system 902 can perform autonomous vehicle motion planning and enable operation of an autonomous vehicle. In some implementations, the computing system 902 can be included in an autonomous vehicle. For example, the computing system 902 can be on-board the autonomous vehicle. In other implementations, the computing system 902 is not located on-board the autonomous vehicle. For example, the computing system 902 can operate offline. The computing system 902 can include one or more distinct physical computing devices.

The computing system 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage media, such as RAM, ROM, EEPROM, EPROM, one or more memory devices, flash memory devices, etc., and combinations thereof.

The memory 914 can store information that can be accessed by the one or more processors 912. For instance, the memory 914 (e.g., one or more non-transitory computer-readable storage mediums, memory devices) can store data 916 that can be obtained, received, accessed, written, manipulated, created, and/or stored. The data 916 can include, for instance, sensor data, data identifying detected and/or classified objects including current object states and predicted object locations and/or trajectories, motion plans, operation parameters, user profile attributes, machine-learned models, rules, etc. as described herein. In some implementations, the computing system 902 can obtain data from one or more memory device(s) that are remote from the system 902.

The memory 914 can also store computer-readable instructions 918 that can be executed by the one or more processors 912. The instructions 918 can be software written in any suitable programming language or can be implemented in hardware. Additionally, or alternatively, the instructions 918 can be executed in logically and/or virtually separate threads on processor(s) 912.

For example, the memory 914 can store instructions 918 that when executed by the one or more processors 912 cause the one or more processors 912 to perform any of the operations and/or functions described herein, including, for example, one or more operations of FIG. 5 through FIG. 8.

According to an aspect of the present disclosure, the computing system 902 can store or include one or more machine-learned models 910. As examples, the machine-learned models 910 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the computing system 902 can receive the one or more machine-learned models 910 from the machine learning computing system 930 over network 980 and can store the one or more machine-learned models 910 in the memory 914. The computing system 902 can then use or otherwise implement the one or more machine-learned models 910 (e.g., by processor(s) 912). For example, in some implementations, the computing system 902 can employ the machine-learned model(s) 910 by inputting prior trip data and receiving a prediction of one or more user preference attributes or settings as an output of the machine-learned model(s) 910.

The machine learning computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage media, such as RAM, ROM, EEPROM, EPROM, one or more memory devices, flash memory devices, etc., and combinations thereof.

The memory 934 can store information that can be accessed by the one or more processors 932. For instance, the memory 934 (e.g., one or more non-transitory computer-readable storage mediums, memory devices) can store data 936 that can be obtained, received, accessed, written, manipulated, created, and/or stored. The data 936 can include, for instance, demographics, user profiles, generalized service histories, machine-learned models, rules, etc. as described herein. In some implementations, the machine learning computing system 930 can obtain data from one or more memory device(s) that are remote from the system 930.

The memory 934 can also store computer-readable instructions 938 that can be executed by the one or more processors 932. The instructions 938 can be software written in any suitable programming language or can be implemented in hardware. Additionally, or alternatively, the instructions 938 can be executed in logically and/or virtually separate threads on processor(s) 932.

For example, the memory 934 can store instructions 938 that when executed by the one or more processors 932 cause the one or more processors 932 to perform any of the operations and/or functions described herein, including, for example, one or more operations of FIG. 5 through FIG. 8.

In some implementations, the machine learning computing system 930 includes one or more server computing devices. If the machine learning computing system 930 includes multiple server computing devices, such server computing devices can operate according to various computing architectures, including, for example, sequential computing architectures, parallel computing architectures, or some combination thereof.

In addition or alternatively to the model(s) 910 at the computing system 902, the machine learning computing system 930 can include one or more machine-learned models 940. As examples, the machine-learned models 940 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the machine learning computing system 930 can communicate with the computing system 902 according to a client-server relationship. For example, the machine learning computing system 930 can implement the machine-learned models 940 to provide a web service to the computing system 902.

Thus, machine-learned models 910 can be located and used at the computing system 902 and/or machine-learned models 940 can be located and used at the machine learning computing system 930.

In some implementations, the machine learning computing system 930 and/or the computing system 902 can train the machine-learned models 910 and/or 940 through use of a model trainer 960. The model trainer 960 can train the machine-learned models 910 and/or 940 using one or more training or learning algorithms. One example training technique is backwards propagation of errors. In some implementations, the model trainer 960 can perform supervised training techniques using a set of labeled training data. In other implementations, the model trainer 960 can perform unsupervised training techniques using a set of unlabeled training data. The model trainer 960 can perform a number of generalization techniques to improve the generalization capability of the models being trained. Generalization techniques include weight decays, dropouts, or other techniques.

In particular, the model trainer 960 can train a machine-learned model 910 and/or 940 based on a set of training data 962. The training data 962 can include, for example, a plurality of prior trip histories, user preferences, user profile data and/or statistics, user demographics, and/or the like. The model trainer 960 can train a machine-learned model 910 and/or 940, for example, by using the set of training data 962.

For example, the model trainer 960 can provide some part of the training data 962 as input into the machine-learned model 910 and/or 940, receive predictions of a user preference or attribute setting as an output of the machine-learned model 910 and/or 940, and evaluate an objective function that describes a difference between a predicted value output of the machine-learned model 910 and/or 940 and a labeled value from the training data 962. The model trainer 960 can train the machine-learned model 910 and/or 940 based at least in part on the objective function. As one example, in some implementations, the objective function can be back-propagated through the machine-learned model 910 and/or 940 to train the machine-learned model 910 and/or 940. In such fashion, the machine-learned model 910 and/or 940 can be trained to provide more intelligent default settings or attributes for use in generating user profiles. The model trainer 960 can be implemented in hardware, firmware, and/or software controlling one or more processors.

The computing system 902 can also include a network interface 924 used to communicate with one or more systems or devices, including systems or devices that are remotely located from the computing system 902. The network interface 924 can include any circuits, components, software, etc. for communicating with one or more networks (e.g., 980). In some implementations, the network interface 924 can include, for example, one or more of a communications controller, receiver, transceiver, transmitter, port, conductors, software, and/or hardware for communicating data. Similarly, the machine learning computing system 930 can include a network interface 964.

The network(s) 980 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 980 can be accomplished, for instance, via a network interface using any type of protocol, protection scheme, encoding, format, packaging, etc.

FIG. 9 illustrates one example computing system 900 that can be used to implement the present disclosure. Other computing systems can be used as well. For example, in some implementations, the computing system 902 can include the model trainer 960 and the training dataset 962. In such implementations, the machine-learned models 910 can be both trained and used locally at the computing system 902. As another example, in some implementations, the computing system 902 is not connected to other computing systems.

In addition, components illustrated and/or discussed as being included in one of the computing systems 902 or 930 can instead be included in another of the computing systems 902 or 930. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices. While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for applying user profiles for autonomous vehicle operation comprising:
    receiving, by a computing system comprising one or more computing devices, a trip request from a user that requests a vehicle service to fulfill a trip;
    retrieving, by the computing system, a user profile associated with the user, wherein the user profile comprises data that describes one or more user preferences associated with the user;
    determining, by the computing system, one or more current conditions associated with the trip, wherein the one or more current conditions comprise one or more of: a traffic condition, a safety condition, or a remaining trip time;
    modifying, by the computing system, one or more of the user preferences based at least in part on the one or more current conditions to obtain one or more modified user preferences;
    determining, by the computing system, one or more trip attribute settings, wherein the one or more trip attribute settings are based at least in part on the one or more modified user preferences, wherein the one or more trip attribute settings are used in adjusting factor weights associated with driving operation parameters of an autonomous vehicle, wherein the factor weights associated with the driving operation parameters are used to control a driving style of an autonomous vehicle while providing the vehicle service to the user, wherein the driving operation parameters comprise one or more of travel speeds, braking style, or turn style; and
    providing, by the computing system, the determined one or more trip attribute settings to a vehicle computing system associated with the autonomous vehicle for use in adjusting the factor weights to control the driving style of the autonomous vehicle during the trip associated with the trip request.

2. The method of claim 1, wherein the one or more trip attribute settings are applied prior to arrival of the autonomous vehicle for the trip associated with the trip request.

3. The method of claim 1, wherein the one or more trip attribute settings are applied during the trip associated with the trip request.

4. The method of claim 1, wherein the one or more trip attribute settings to be applied are determined based at least in part on one or more of a trip request type, a vehicle type, or a time associated with the trip request.

5. The method of claim 1, wherein the user profile comprises at least one of:
    a prior trip history,
    a vehicle type preference,
    a route type preference,
    a stop preference,
    a vehicle environment preference, or
    a driving characteristic preference.

6. The method of claim 1, further comprising:
    retrieving, by the computing system, the user profile associated with the user;
    providing, for display to the user, indications of one or more user profile attribute settings;
    receiving a request to modify one of the user profile attribute settings; and
    updating, by the computing system, the user profile based at least in part on the requested modification.

7. The method of claim 1, further comprising:
    determining, by the computing system, one or more vehicle setting changes applied during the trip; and
    updating, by the computing system, the user profile based at least in part on the one or more vehicle setting changes.

8. An autonomous vehicle comprising:
    a vehicle computing system comprising:
        one or more processors; and
        one or more memories including instructions that, when executed by the one or more processors, cause the one or more processors to perform operations, the operations comprising:
        receiving data indicative of a trip service that requests a vehicle service to fulfill a trip;
        receiving a user profile associated with a user, wherein the user profile comprises data that describes one or more user preferences associated with the user;
        receiving one or more current conditions associated with the trip, wherein the one or more current conditions comprise one or more of: a traffic condition, a safety condition, or a remaining trip time;
        receiving modified user preferences based at least in part on the one or more current conditions;
        receiving one or more trip attribute settings determined based at least in part on the modified user preferences, wherein the one or more trip attribute settings are used in adjusting factor weights associated with operation parameters of the autonomous vehicle, wherein the factor weights associated with the operation parameters are used to control a driving style of an autonomous vehicle while providing the vehicle service to the user, wherein the operation parameters comprise one or more of travel speeds, braking style, or turn style; and applying the determined one or more trip attribute settings in adjusting the factor weights to control the driving style of the autonomous vehicle during the trip associated with the trip service.

9. The autonomous vehicle of claim 8, wherein the one or more trip attribute settings are applied prior to arrival of the autonomous vehicle for the trip associated with the trip service.

10. The autonomous vehicle of claim 8, wherein the one or more trip attribute settings are applied during the trip associated with the trip service.

11. The autonomous vehicle of claim 8, wherein the one or more trip attribute settings to be applied are determined based at least in part on one or more of a trip service type, a vehicle type, or a time associated with the trip service.

12. The autonomous vehicle of claim 8, wherein the user profile comprises at least one of:
a prior trip history,
a vehicle type preference,
a route type preference,
a stop preference,
a vehicle environment preference, or
a driving characteristic preference.

13. The autonomous vehicle of claim 8, the operation further comprising:
determining one or more vehicle setting changes applied during the trip; and
updating the user profile based on the based at least in part on the one or more vehicle setting changes.

14. A computing system comprising:
one or more processors; and
one or more memories including instructions that, when executed by the one or more processors, cause the one or more processors to perform operations, the operations comprising:
receiving a trip request from a user that requests a vehicle service to fulfill a trip;
retrieving a user profile associated with the user, wherein the user profile comprises data that describes one or more user preferences associated with the user;
determining one or more current conditions associated with the trip, wherein the one or more current conditions comprise one or more of: a traffic condition, a safety condition, or a remaining trip time;
modifying one or more of the user preferences based at least in part on the one or more current conditions to obtain one or more modified user preferences;
determining one or more trip attribute settings based at least in part on the one or more modified user preferences, wherein the one or more trip attribute settings are used in adjusting factor weights associated with driving operation parameters of an autonomous vehicle, wherein the factor weights associated with the driving operation parameters are used to control a driving style of an autonomous vehicle while providing the vehicle service to the user, wherein the driving operation parameters comprise one or more of travel speeds, braking style, or turn style; and
providing the determined one or more trip attribute settings to an autonomous vehicle to be applied in adjusting the factor weights to control the driving style of the autonomous vehicle during the trip.

15. The computing system of claim 14, wherein the one or more trip attribute settings are applied prior to arrival of the autonomous vehicle for the trip associated with the trip request or are applied during the trip associated with the trip request.

16. The computing system of claim 14, wherein the user profile comprises at least one of:
a prior trip history,
a vehicle type preference,
a route type preference,
a stop preference,
a vehicle environment preference, or
a driving characteristic preference.

* * * * *